Patented June 13, 1944

2,351,241

UNITED STATES PATENT OFFICE 2,351,241

ROAD CONSTRUCTIONAL MATERIAL

Heinrich Ulrich, Ernst Ploetz, and Oskar Ferrares, Ludwigshafen-on-the-Rhine, Germany; vested in the Alien Property Custodian No Drawing. Application November 14, 1940, Serial No. 365,650

2 Claims. (Cl. 106—281)

The present invention relates to bituminous road constructional materials.

We have found that bituminous road constructional materials may be prepared in a very advantageous manner by incorporating with the bituminous binding agents and the stone material, i. e., the rocks, pebble, stone, gravel, split and the like, nitrogenous substances obtainable by the interaction of alkylene diamines or polyalkylene polyamines and the sulfochlorides resulting from the action of halogen and sulphur dioxide on aliphatic hydrocarbons or halogenated aliphatic hydrocarbons containing at least 10 carbon atoms in the molecule.

The said nitrogenous substances may be derived for example from ethylene diamine, propylene diamine, hexamethylene diamine or diethylene triamine, triethylene tetramine etc. or the corresponding polyalkylene polyamines containing propylene or higher alkylene groups on the one hand and the products resulting from the action of chlorine and sulphur dioxide on decane, dodecane, octodecane or their chlorination products on the other hand. The sulfochlorides may be prepared for example according to application Ser. No. 227,510, filed in the names of Paul Herold, Karl Smeykal, Friedrich Asinger and Wilhelm Wolf on August 30, 1938. Instead of substances made from said single components there may be used substances obtained from mixtures of the said di- or polyamines and/or mixtures of sulfochlorides of the said kind such as may be prepared from paraffin wax or aliphatic mineral oil fractions consisting substantially of paraffinic hydrocarbons with at least 10 carbon atoms. Other suitable starting materials for the preparation of the sulfochlorides are the aliphatic hydrocarbon mixtures resulting from the catalytic hydrogenation of carbon monoxide at relatively low superatmospheric pressures or the hydrocarbon mixtures obtainable by catalytic hydrogenation of olefines formed by dehydration of alcohols containing at least 10 carbon atoms which are obtained as by-products in the catalytic synthesis of methanol from carbon monoxide and hydrogen. Chlorination products of all of the said aliphatic hydrocarbons may also serve for the preparation of the sulfochlorides.

While rocks and stones of basic character, such as limestone, magnesite and clays, are by their nature hydrophobic to a certain degree and may therefore comparatively readily be combined with bituminous binding agents, in contradistinction thereto rock and stone varieties of acid character, such as granite and porphyry, are generally speaking hydrophilic and can only be combined with difficulty with bituminous binding agents. Accordingly, in the case of acid rock and stone it is especially advantageous to add the said nitrogenous substances which facilitate the combination of the two components.

Road constructional materials are prepared for example by bringing together hydrophilic varieties of rock or stone, such as porphyry, syenite, basalt, trass and the like which possess excellent hardness, great resistance to compression and stability to weathering influences, and suitable bituminous binding agents, as for example tar or asphalt, in the presence of the above described nitrogenous substances. The latter may be used in varying amounts which depend on the nature of the other components of the constructional material. For example a few per cent of the nitrogenous substances, calculated with reference to the binding agent, may be used, but in many cases amounts of about 1 per cent or less are sufficient. The road may be laid out in different ways. The said components of the mixture may be brought together simultaneously while thoroughly mixing them and the mixture then applied to the rock material; or the rock or stone may first be mixed with the binding agent and the nitrogenous substance of the said type then added, whereupon by further mixing the desired good combination of the components is effected. The di- or polyamine-sulfochloride reaction products may also first be applied to the rock or stone which is then mixed with the bituminous material; when the said nitrogenous substance is used in solution or in suspension in a liquid the mixture may be dried before the bituminous binding agent is added. The rock or stone may also be mixed with a solution or dispersion of the said nitrogenous substances in the binding agent.

The process may also be used with advantage with basic rock or stone, in particular such as contains considerable admixtures of acid rock or stone. A particular advantage resides in the fact that even binding agents containing large amounts of water, as for example emulsions, as well as wet rock or stone, can be readily made to adhere. Furthermore, working in wet weather, which otherwise is frequently difficult, offers no difficulty.

The nature of the road constructional material may be varied in any desired manner by an addition of flux oils or substances increasing the viscosity or by chlorination of the bituminous binding agent or, when the latter is used in the form of an emulsion, by an addition of emulsifying agents or by other similar measures.

The said nitrogenous substances may also be very advantageously used in filling grooves, such as occur for example in the construction of concrete roads, with bituminous materials.

By using more or less readily volatile bitumen solvents, an increased stability to frost and an increased lubricating property of the freshly prepared bitumen on the stone are obtained; this is advantageous in the rolling-in process in road construction and is necessary for the complete coating and covering of porous concrete surfaces.

The following examples will further illustrate the nature of this invention but the invention is not restricted to these examples. The parts are by weight.

Example 1

The surface of a freshly-made and shortly set concrete road covering is coated with a mixture of 78 parts of 60/40 road tar, 20 parts of asphalt bitumen having a softening point of 45° C. (according to Kraemer-Sarnow) and 2 parts of the reaction product of a diethylene triamine and a mixture of sulfochlorides obtained by treating a mixture of paraffin hydrocarbons containing from 10 to 18 carbon atoms in the molecule with chlorine and sulfur dioxide in the manner described in application Ser. No. 227,510. The upper layer can be applied to moist cement and its adhesion is not injured or impaired by any influence of external moisture, such as under ground water, rain and the like.

Example 2

100 parts of porphyry chips of from 5 to 8 millimeters size are sprayed and completely moistened by mechanical mixing with 10 parts of a 2 per cent aqueous solutions of the reaction product of polyethylene polyamine (a mixture of diethylene triamine, triethylene tetramine and the higher analogous compounds obtainable by reacting ethylene chloride with ammonia) and a mixture of sulfochlorides obtained by causing chlorine and sulfur dioxide to act on a mixture of aliphatic hydrocarbons with 16 to 18 carbon atoms originating from the catalytic hydrogenation of carbon monoxide, the treatment with chlorine and sulfur dioxide being carried out in the manner described in application Ser. No. 227,510. The moistened porphyry chips are mixed with suitable amounts of an asphalt bitumen known under the name "Spramex 300" (having a softening point according to Kraemer-Sarnow of about 20° C.) which has been rendered workable in the cold by an addition of 20 per cent of benzene first runnings. The stone is uniformly coated with bitumen and the coating suffers scarcely any change after standing for 8 days under water, even when the temperature is temporarily raised to 75° C.

In the absence of the said nitrogenous additional substance only a bad combination of the bitumen with the stone takes place and after standing for a relatively short time under water at ordinary temperature such coating of bitumen is entirely loosened from the stone.

What we claim is:

1. A process for the production of bituminous road constructional materials which comprises incorporating with a bituminous binding agent and a stone material a sulfonamide having the nitrogen atom substituted by an aliphatic chain to which is attached a terminal amino group, which sulfonamide is obtainable by reacting a substance selected from the class consisting of alkylene diamines and polyalkylene polyamines with a sulfochloride resulting from the interaction of halogen, sulfur dioxide and a substance selected from the class consisting of aliphatic hydrocarbons and halogenated aliphatic hydrocarbons containing at least 10 carbon atoms in the molecule.

2. Bituminous road constructional materials comprising in intimate combination a bituminous binding agent and a stone material and a sulfonamide having the nitrogen atom substituted by an aliphatic chain to which is attached a terminal amino group, which sulfonamide is obtainable by reacting a substance selected from the class consisting of alkylene diamines and polyalkylene polyamines with a sulfochloride resulting from the interaction of halogen, sulfur dioxide and a substance selected from the class consisting of aliphatic hydrocarbons and halogenated aliphatic hydrocarbons containing at least 10 carbon atoms in the molecule.

HEINRICH ULRICH.
ERNST PLOETZ.
OSKAR FERRARES.